(12) United States Patent
Von Novak et al.

(10) Patent No.: US 8,497,658 B2
(45) Date of Patent: Jul. 30, 2013

(54) ADAPTIVE POWER CONTROL FOR WIRELESS CHARGING OF DEVICES

(75) Inventors: William H Von Novak, San Diego, CA (US); Stanley S Toncich, San Diego, CA (US); Stanton C Braden, San Diego, CA (US); Ian J Fevrier, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 487 days.

(21) Appl. No.: 12/616,034

(22) Filed: Nov. 10, 2009

(65) Prior Publication Data

US 2010/0181961 A1 Jul. 22, 2010

Related U.S. Application Data

(60) Provisional application No. 61/146,586, filed on Jan. 22, 2009, provisional application No. 61/151,156, filed on Feb. 9, 2009, provisional application No. 61/183,907, filed on Jun. 3, 2009.

(51) Int. Cl.
*H02J 7/00* (2006.01)

(52) U.S. Cl.
USPC ............................................. 320/108

(58) Field of Classification Search
USPC ............................................. 320/108
See application file for complete search history.

(56) References Cited

U.S. PATENT DOCUMENTS

| | | |
|---|---|---|
| 4,799,066 A | 1/1989 | Deacon |
| 5,195,045 A | 3/1993 | Keane et al. |
| 5,399,955 A | 3/1995 | Glaser et al. |
| 5,519,262 A | 5/1996 | Wood |
| 5,689,355 A * | 11/1997 | Okubo et al. ................ 398/116 |
| 5,726,551 A * | 3/1998 | Miyazaki et al. ............ 320/124 |
| 5,854,481 A | 12/1998 | Ricotti et al. |

(Continued)

FOREIGN PATENT DOCUMENTS

| | | |
|---|---|---|
| DE | 102007010896 | 9/2008 |
| EP | 1986304 A2 | 10/2008 |

(Continued)

OTHER PUBLICATIONS

International Search Report and Written Opinion—PCT/US2010/021873, International Search Authority—European Patent Office—Apr. 4, 2011.

(Continued)

*Primary Examiner* — Arun Williams
(74) *Attorney, Agent, or Firm* — Knobbe, Martens, Olson & Bear, LLP

(57) ABSTRACT

Exemplary embodiments are directed to wireless power transfer. A transmitter generates an electromagnetic field at a resonant frequency with a transmit antenna to create a coupling-mode region within a near field of the transmit antenna. The transmitter defines a beginning of a recurring period by on-off keying the electromagnetic field during a synchronization portion of the recurring period. During a power transmission portion of the recurring period, the transmitter couples portions of the electromagnetic field to different receive antennas of various receiver devices within the coupling-mode region. The transmitter also determines a power allocation within the recurring period for the various receiver devices disposed within the coupling-mode region and adjusts a power level of the near field radiation responsive to power requirements received from the receiver devices.

43 Claims, 9 Drawing Sheets

U.S. PATENT DOCUMENTS

| | | | |
|---|---|---|---|
| 5,991,608 | A | 11/1999 | Leyten |
| 6,057,668 | A | 5/2000 | Chao |
| 6,094,084 | A | 7/2000 | Abou-Allam et al. |
| 6,127,799 | A * | 10/2000 | Krishnan ............... 320/104 |
| 6,134,130 | A | 10/2000 | Connell et al. |
| 6,161,762 | A | 12/2000 | Bashan et al. |
| 6,211,753 | B1 | 4/2001 | Leifso et al. |
| 6,291,968 | B1 * | 9/2001 | Nantz et al. ............. 320/108 |
| 6,316,909 | B1 | 11/2001 | Honda et al. |
| 6,321,067 | B1 | 11/2001 | Suga et al. |
| 6,424,232 | B1 | 7/2002 | Mavretic et al. |
| 6,427,065 | B1 | 7/2002 | Suga et al. |
| 6,480,110 | B2 | 11/2002 | Lee et al. |
| 6,498,455 | B2 | 12/2002 | Zink et al. |
| 6,515,919 | B1 | 2/2003 | Lee |
| 6,556,415 | B1 | 4/2003 | Lee et al. |
| 6,650,213 | B1 | 11/2003 | Sakurai et al. |
| 6,840,440 | B2 | 1/2005 | Uozumi et al. |
| 6,889,905 | B2 | 5/2005 | Shigemasa et al. |
| 6,906,495 | B2 | 6/2005 | Cheng et al. |
| 6,992,366 | B2 | 1/2006 | Kim et al. |
| 7,009,860 | B2 | 3/2006 | Kazutoshi |
| 7,023,395 | B2 | 4/2006 | Ohara et al. |
| 7,167,090 | B1 | 1/2007 | Mandal et al. |
| 7,283,922 | B2 | 10/2007 | Kurtz et al. |
| 7,426,373 | B2 | 9/2008 | Clingman et al. |
| 7,548,040 | B2 * | 6/2009 | Lee et al. ............... 320/108 |
| 7,570,220 | B2 | 8/2009 | Hall et al. |
| 7,714,537 | B2 | 5/2010 | Cheng et al. |
| 7,741,734 | B2 | 6/2010 | Joannopoulos et al. |
| 7,762,471 | B2 | 7/2010 | Tanner |
| 7,825,543 | B2 | 11/2010 | Karalis et al. |
| 7,863,859 | B2 | 1/2011 | Soar |
| 7,880,337 | B2 | 2/2011 | Farkas |
| 7,975,921 | B2 | 7/2011 | Mani et al. |
| 2004/0130915 | A1 | 7/2004 | Baarman |
| 2004/0204781 | A1 | 10/2004 | Hsien |
| 2005/0127867 | A1 | 6/2005 | Calhoon et al. |
| 2005/0131495 | A1 | 6/2005 | Parramon et al. |
| 2005/0151575 | A1 | 7/2005 | Sibrai et al. |
| 2007/0021140 | A1 | 1/2007 | Keyes et al. |
| 2007/0058402 | A1 | 3/2007 | Shekhawat et al. |
| 2007/0197180 | A1 | 8/2007 | McKinzie, III |
| 2007/0207753 | A1 | 9/2007 | Byun |
| 2007/0222542 | A1 | 9/2007 | Joannopoulos et al. |
| 2007/0236851 | A1 | 10/2007 | Shameli et al. |
| 2007/0267918 | A1 | 11/2007 | Gyland |
| 2007/0285255 | A1 | 12/2007 | Tsushima et al. |
| 2007/0296548 | A1 | 12/2007 | Hall et al. |
| 2007/0298846 | A1 | 12/2007 | Greene et al. |
| 2008/0067874 | A1 | 3/2008 | Tseng |
| 2008/0116846 | A1 | 5/2008 | Greenfeld et al. |
| 2008/0116990 | A1 | 5/2008 | Rokhsaz |
| 2008/0162973 | A1 * | 7/2008 | Landry et al. ............ 713/340 |
| 2008/0191897 | A1 | 8/2008 | McCollough |
| 2008/0211455 | A1 | 9/2008 | Park et al. |
| 2008/0238364 | A1 | 10/2008 | Weber et al. |
| 2008/0238632 | A1 | 10/2008 | Endo et al. |
| 2008/0272889 | A1 | 11/2008 | Symons |
| 2008/0278264 | A1 | 11/2008 | Karalis et al. |
| 2008/0315826 | A1 | 12/2008 | Alberth, Jr. et al. |
| 2009/0058361 | A1 | 3/2009 | John |
| 2009/0102296 | A1 | 4/2009 | Greene et al. |
| 2009/0111531 | A1 | 4/2009 | Cui et al. |
| 2009/0140691 | A1 * | 6/2009 | Jung ..................... 320/108 |
| 2009/0146892 | A1 | 6/2009 | Shimizu et al. |
| 2009/0224608 | A1 | 9/2009 | Cook et al. |
| 2009/0243397 | A1 | 10/2009 | Cook et al. |
| 2009/0257259 | A1 | 10/2009 | Leibovitz |
| 2009/0284218 | A1 | 11/2009 | Mohammadian et al. |
| 2009/0284369 | A1 | 11/2009 | Toncich et al. |
| 2009/0286475 | A1 | 11/2009 | Toncich et al. |
| 2009/0286476 | A1 | 11/2009 | Toncich et al. |
| 2010/0123429 | A1 * | 5/2010 | Chen et al. ............. 320/108 |
| 2010/0148723 | A1 | 6/2010 | Cook et al. |
| 2011/0234011 | A1 | 9/2011 | Yi et al. |
| 2011/0241437 | A1 | 10/2011 | Kanno |
| 2011/0266882 | A1 | 11/2011 | Yamamoto et al. |
| 2012/0038220 | A1 | 2/2012 | Kim et al. |
| 2012/0049642 | A1 | 3/2012 | Kim et al. |
| 2012/0262004 | A1 | 10/2012 | Cook et al. |

FOREIGN PATENT DOCUMENTS

| | | | |
|---|---|---|---|
| GB | 2422517 | A | 7/2006 |
| JP | 8501435 | A | 2/1996 |
| JP | 10145987 | A | 5/1998 |
| JP | 2001307032 | A | 11/2001 |
| JP | 2002078247 | A | 3/2002 |
| JP | 2007125926 | A | 5/2007 |
| KR | 1020060122217 | | 11/2006 |
| WO | WO0195432 | A1 | 12/2001 |
| WO | WO2004032349 | | 4/2004 |
| WO | WO2007008608 | | 1/2007 |
| WO | WO2007084717 | | 7/2007 |
| WO | 2007095267 | | 8/2007 |
| WO | WO2007089086 | | 8/2007 |
| WO | WO2007090168 | | 8/2007 |
| WO | WO2007150070 | | 12/2007 |
| WO | WO2008017818 | | 2/2008 |
| WO | WO2008133388 | A1 | 11/2008 |

OTHER PUBLICATIONS

Joung, et al., "An Energy Transmission System for an Artificial Heart Using Leakage Inductance Compensation of Transcutaneous Transformer", IEEE Transactions on Power Electronics, vol. 13, No. 6, Nov. 1998, pp. 1013-1022.

Karalis et al.,"Efficient wireless non-radiative mid-range energy transfer", Science Direct, Annals of physics, 323(1), pp. 34-48, (Jan. 2008).

Karalis et al., "Efficient wireless non-radiative mid-range energy transfer", MIT paper, publication and date unknown, believed to be 2007.

Karalis et al., "Wireless Non-Radiative Energy Transfer", MIT paper, publication and date unknown, believed to be 2007.

Kurs et al., "Wireless Power Transfer via Strongly Coupled Magnetic Resonances", Science 317(5834):, 83-86, Jul. 6, 2007.

Kurs et al., "Wireless Power Transfer via Strongly Coupled Magnetic Resonances", Supporting Online Material, Science Express, Jun. 7, 2007.

* cited by examiner

US 8,497,658 B2

ADAPTIVE POWER CONTROL FOR WIRELESS CHARGING OF DEVICES

CLAIM OF PRIORITY UNDER 35 U.S.C. §119

This application claims priority under 35 U.S.C. §119(e) to:

U.S. Provisional Patent Application 61/146,586 entitled "POWER SHARING FOR WIRELESS POWER DEVICES" filed on Jan. 22, 2009.

U.S. Provisional Patent Application 61/151,156 entitled "DYNAMIC POWER CONTROL METHODOLOGY FOR WIRELESS CHARGING" filed on Feb. 9, 2009.

U.S. Provisional Patent Application 61/183,907 entitled "ADAPTIVE POWER CONTROL FOR WIRELESSLY CHARGING DEVICES" filed on Jun. 3, 2009.

BACKGROUND

1. Field

The present invention relates generally to wireless charging, and more specifically to devices, systems, and methods related to allocating power to receiver devices that may be located in wireless power systems.

2. Background

Typically, each battery powered device such as a wireless electronic device requires its own charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. Antennas are generally of resonant length in order to improve the coupling efficiency. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the electronic device to be charged. This approach has the disadvantage that the spacing between transmit and receive antennas must be very close (e.g., within thousandths of meters). Though this approach does have the capability to simultaneously charge multiple devices in the same area, this area is typically very small and requires the user to accurately locate the devices to a specific area.

For many wireless charging systems, the power transmitted from the source is fixed to a single level, thus the power level generally cannot be adjusted to accommodate devices with different maximum peak power levels. This limits the type of devices that can be charged. Another problem is that fixed radiated power levels cannot be adjusted as a function of the device's current battery level. This wastes power since as the battery charges it needs less and less power to complete the charge. Radiated power from the transmitter that is not absorbed by the device can increase Specific Absorption Rate (SAR) levels. A fixed transmitter power dictates that SAR requirements must be met for the worst case which occurs when the device being charged has poor coupling to the transmitter. Hence, a device with good coupling is limited to the power levels dictated by devices with poor coupling, which can lead to increased charge time for that device. When charging multiple devices, a fixed transmit power implies the same power level must be applied to all devices, no matter what charge level is optimum for each device. As mentioned earlier, this can result in wasted radiated power.

With wireless power transmission there is a need for apparatuses and methods for transmitting and relaying wireless power at varying power levels and multiplexed times to increase power transmission efficiency.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
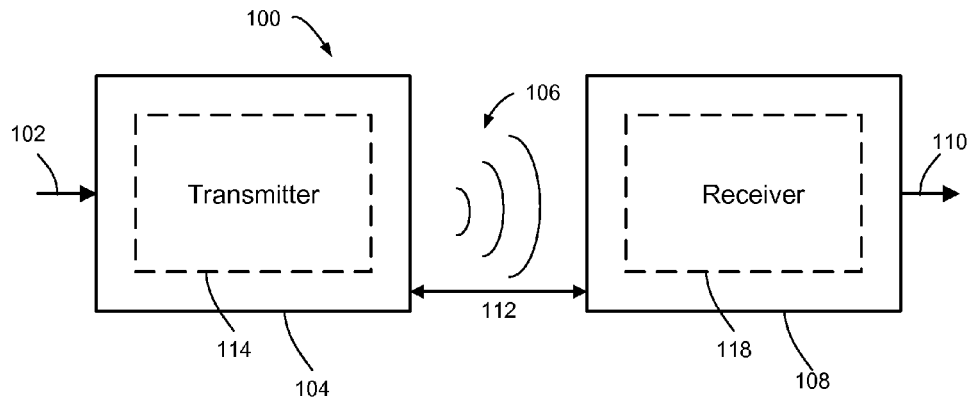
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
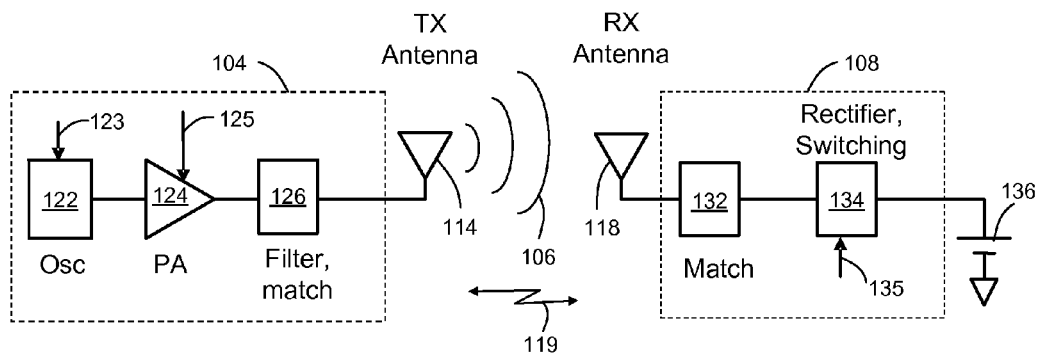
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
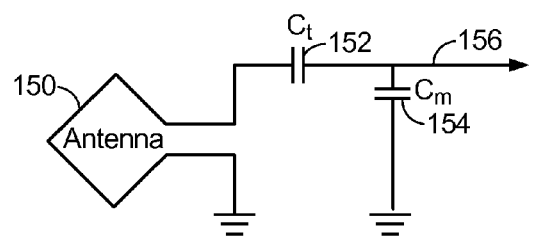
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −1 to −4 dB) can be achieved when the Rx antenna on a host device is placed within a coupling-mode region (i.e., in the near-field) of the driven Tx loop antenna.

Figure 4:
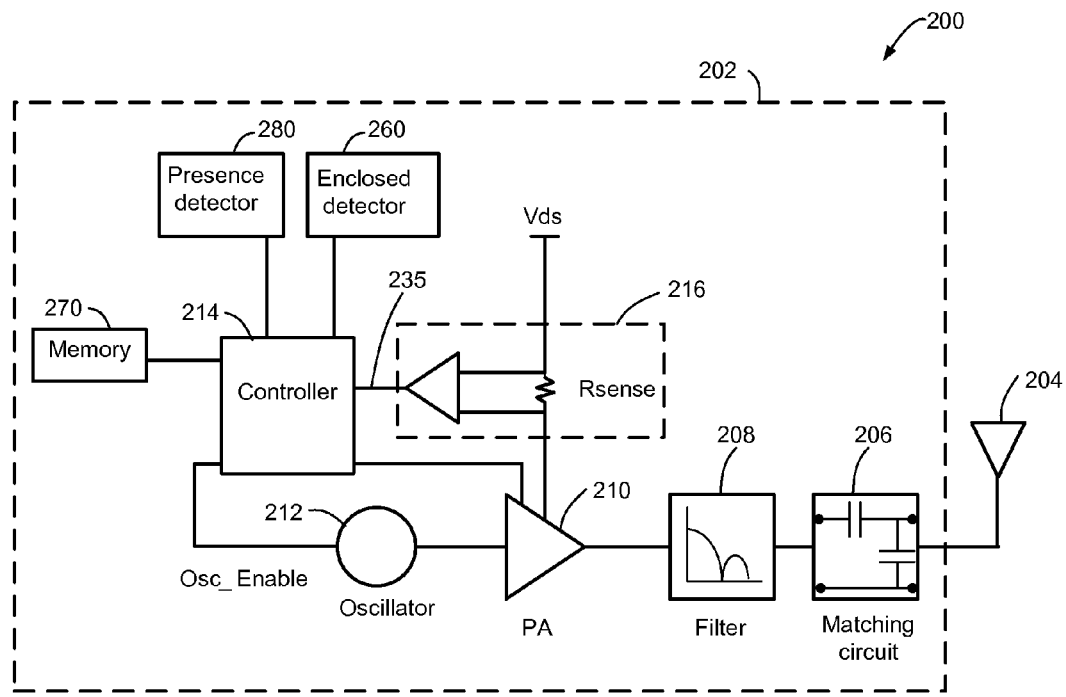
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 to 8.0 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
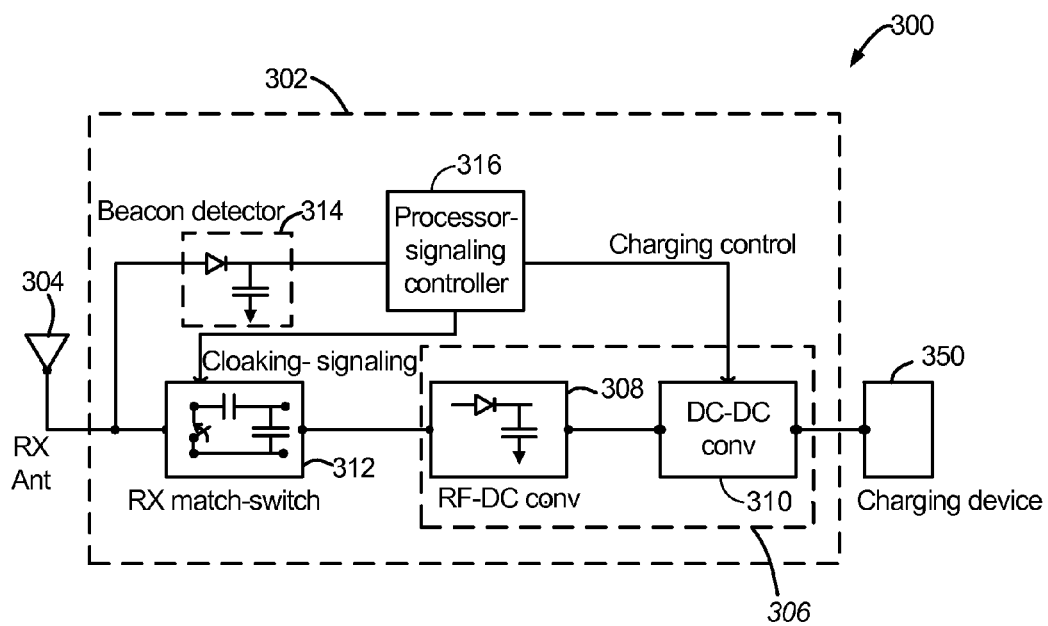
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204

(FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-field. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

In some exemplary embodiments, the receive circuitry 320 may signal a power requirement, as explained more fully below to a transmitter in the form of, for example, desired power level, maximum power level, desired current level, maximum current level, desired voltage level, and maximum voltage level. Based on these levels, and the actual amount of power received from the transmitter, the processor 316 may adjust the operation of the DC-DC converter 310 to regulate its output in the form of adjusting the current level, adjusting the voltage level, or a combination thereof.

Figure 6:
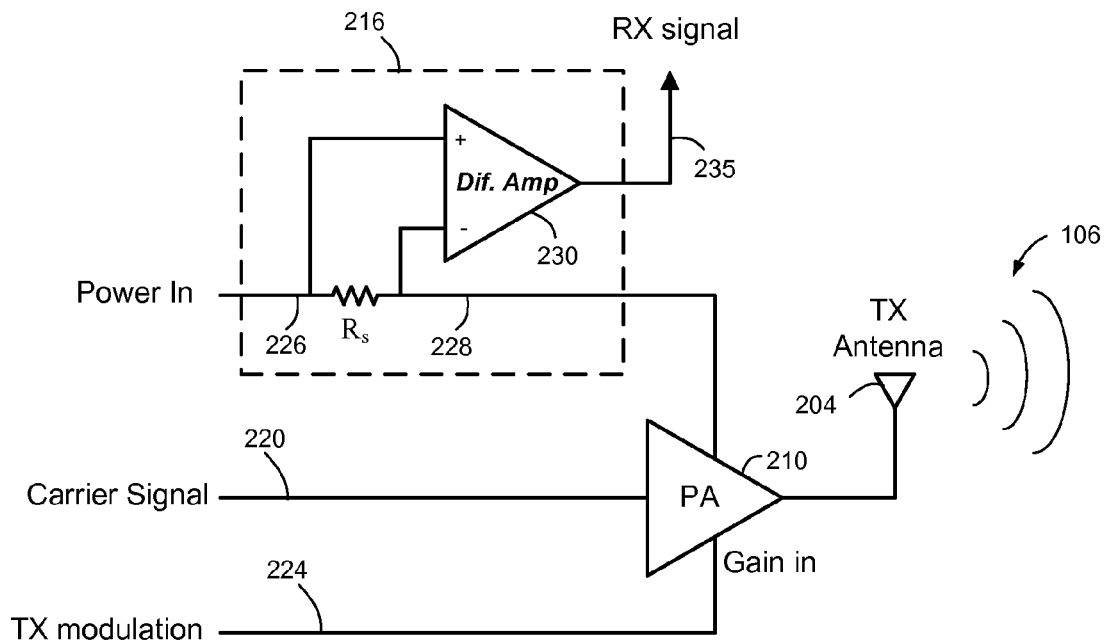
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 210, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

Details of some exemplary embodiments for cloaking signals, beacon signals, and circuits for generating these signals can be seen in U.S. Utility patent application Ser. No. 12/249,873, entitled "REVERSE LINK SIGNALING VIA RECEIVE ANTENNA IMPEDANCE MODULATION" filed on Oct. 10, 2008; and in U.S. Utility patent application Ser. No. 12/249,861, entitled "TRANSMIT POWER CONTROL FOR A WIRELESS CHARGING SYSTEM" filed on Oct. 10, 2008, both herein incorporated by reference in their entirety.

Details of exemplary communication mechanisms and protocols can be seen in U.S. Utility patent application Ser. No. 12/249,866 entitled "SIGNALING CHARGING IN WIRELESS POWER ENVIRONMENT" filed on Oct. 10, 2008, the contents of which is incorporated by reference herein in its entirety.

Figure 7:
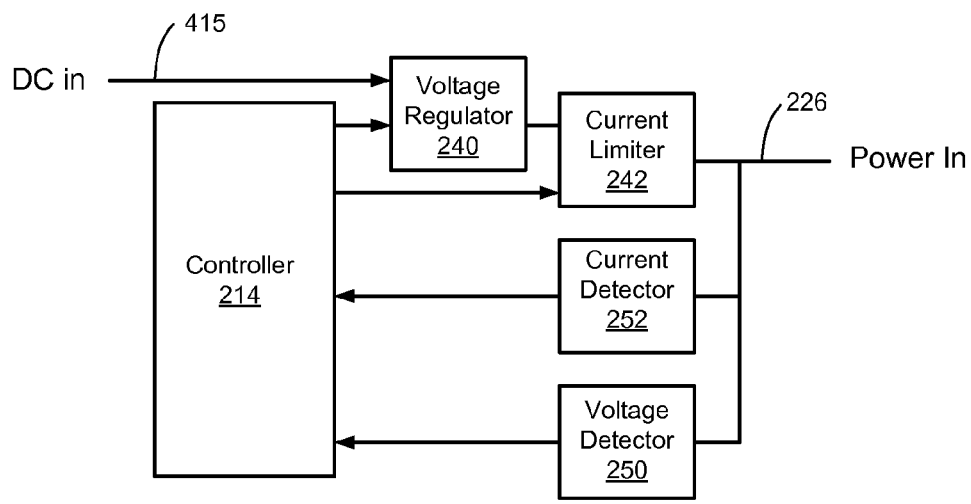
FIG. 7 shows a simplified schematic of a portion of the transmit circuitry for adjusting power levels of a transmitter.

FIG. 7 shows a simplified schematic of a portion of the transmit circuitry for adjusting power levels of a transmitter. In some exemplary embodiments, the controller 214 may be coupled to a voltage regulator 240, a current limiter 242, or a combination thereof to control the amount of power delivered on the power in signal 226 relative to the supplied DC in 415. In addition, some exemplary embodiments may include a current detector 252 and a voltage detector 250 coupled to the power in signal 226 and used to provide feedback to the controller regarding the consumption of power. The load sensing circuit 216 of FIG. 6 is one example of a suitable current detector.

As stated earlier with reference to FIGS. 1, 2, and 4, power may be delivered, using the transmit circuitry 202 and transmit antenna 204, to receiver devices needing charge by placing the receiver devices in the vicinity of a coupling-mode region of the transmit antenna. In exemplary embodiments discussed herein, the transmitter can cycle power sequentially to all of the receiver devices to be charged based on power level, time, and the like. Receiver devices may communicate device power requirements and other information to the transmitter. With this power requirement information, the transmitter can tailor the amount of power that is delivered to each receiver device by adjusting the amount of power transmitted, adjusting the amount of time that power is transmitted, or a combination thereof.

Combinations of the voltage regulator 240 and the current limiter 242 may be used to implement the proper circuitry for adjusting power levels of the transmitter. An adjustable voltage regulator circuit may, for example, include an adjustable potentiometer, a rectifier, possibly a smoothing circuit and possibly a band-gap reference circuit. Example of some voltage regulator circuits suitable for use with embodiments of the invention are illustrated and discussed with reference to FIGS. 8, 9, and 10 below.

A receiver device requiring charging may signal its power requirement needs, for example, in terms of current and voltage to the transmitter. For example, a protocol may be included wherein each receiver device wanting charging signals its power ratings including its peak voltage and current levels. Additionally, a recommended level of current and voltage may also be signaled. Further, an identifier for each device to be charged can likewise be signaled.

The processor 214 may then control, for example, the power that is delivered to the power amplifier 210 (FIG. 6) through the power in signal 226.

In some exemplary embodiments, a voltage detector 250 may be included, for example, either separately as shown in FIG. 7 or as part of the voltage regulator 240. The voltage detector 250 forms a feedback path with the controller 214 to adjust power levels on the power in signal 226. Thus, in connection with controlling the current, the controller 214 may adjust a level within the voltage regulator 240 within specified limits to provide optimal charging to a device to be charged. Thus, that optimal level may be set to not exceed the power rating of the device as determined by the fact that power is the product of voltage and current.

In some exemplary embodiments, a current detector 252 may be included, for example, either separately as shown in FIG. 7 or as part of the current regulator 242. The voltage detector 250 forms a feedback path with the controller 214 to adjust power levels on the power in signal 226. Thus, in connection with controlling the voltage, the controller 214 may adjust a level within the current limiter 242 within specified limits to provide optimal charging to a device to be charged. Thus, the optimal level may be set to not exceed the power rating of the device as determined by the fact that power is the product of voltage and current.

With the current detector 252 and voltage detector 250, the power drawn by each receiver device may be monitored in connection with the voltage and current detectors providing power component (voltage or current) threshold detection. Thus, the controller 214 may adjust voltage and current to different levels for each receiver device that is being charged throughout a charging process.

The receiver devices may signal power requirement needs via a wireless charging signaling protocol as discussed above. In addition, a separate communication channel 119 (e.g., Bluetooth, zigbee, cellular, etc.) may be used to signal power requirements.

Exemplary embodiments of the invention are directed to a dynamic transmit radiated power level control by utilizing adaptive control of the drive voltage, drive current, or a combination thereof to drive the power amplifier 210 (FIG. 6). Changing the drive level changes the RF power output from the PA and hence the power transmitted to the receive devices being charged.

Some exemplary information used to define power levels may include:

1—the device type and optimum RF power level the receiver device would like to see, 2—the current battery charge level of the device being charged, and 3—the RF power level from the transmit source that each device is currently receiving.

Knowing the device type and its preferred RF power level for charging (item 1), the transmit source can be adjusted to this level during the time slot over which it is getting charged, as explained more fully below. Thus, the power level delivered to each device can be independently customized for that device without impacting any of the other devices. Additionally, knowledge of the current battery charge levels of a device being charged (item 2) allows for the radiated RF level to be optimized based on the current battery charge level of the device. Both techniques help to minimize power that would normally be wasted if a fixed transmit power level were implemented.

In addressing RF safety issues, comparing the power level absorbed by each device (item 3) to the power transmitted from the transmitter gives an indication of the total power radiated to the local environment which in turn is proportional to the transmitter SAR level. This allows a means to maximize the radiated power to each device based on each device's coupling ratios to the transmitter while still maintaining acceptable SAR levels. As a result, one is able to improve the power delivered to each device individually rather than be limited to a lower fixed power level dictated by the device with poor coupling to the transmitter. Finally, adjustable radiated power allows for a lower power beacon mode that reduces transmitter AC power consumption when not in charging mode and also reduces the interference to locally-situated electronics.

Figure 8:
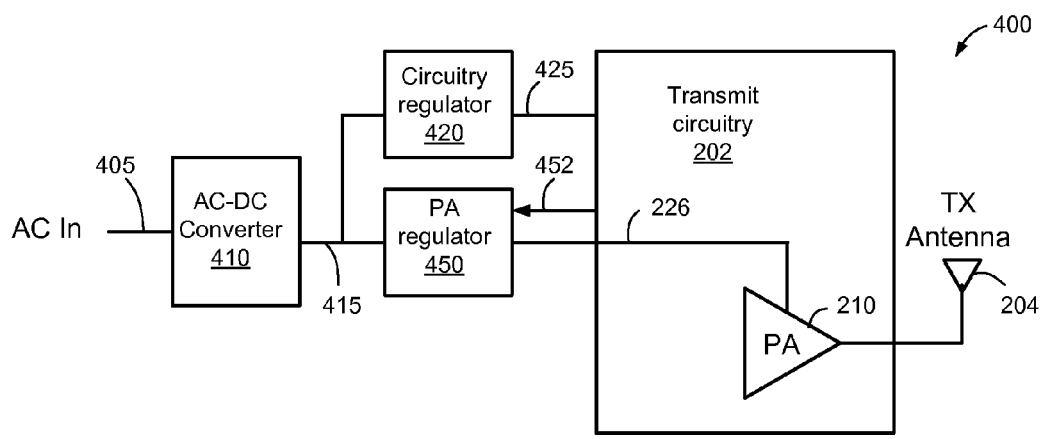
FIG. 8 is a simplified block diagram of an AC-DC power supply that may be used to supply power to a transmitter.
Figure 9:
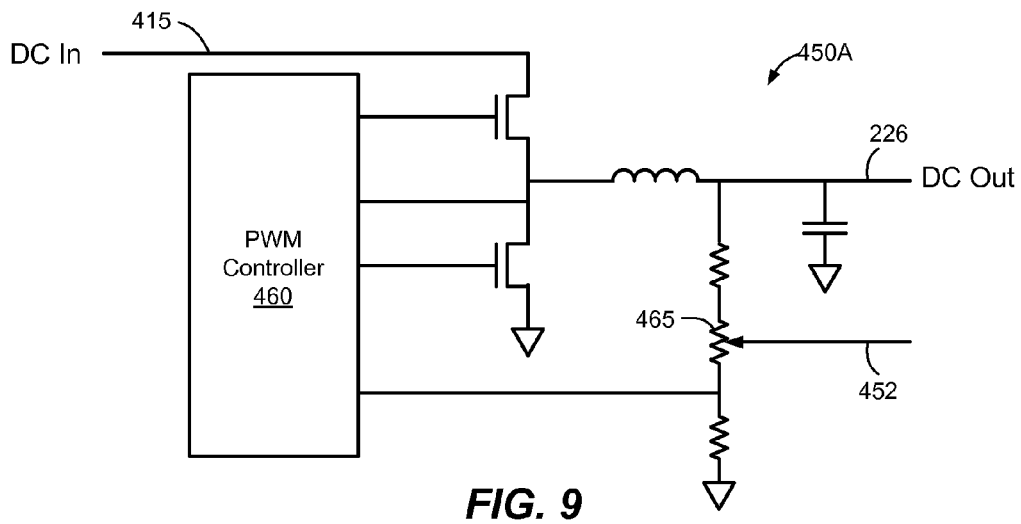
FIG. 9 illustrates a Pulse Width Modulator (PWM) controller that drives two N-channel transistors to create a synchronous buck converter.
Figure 10:
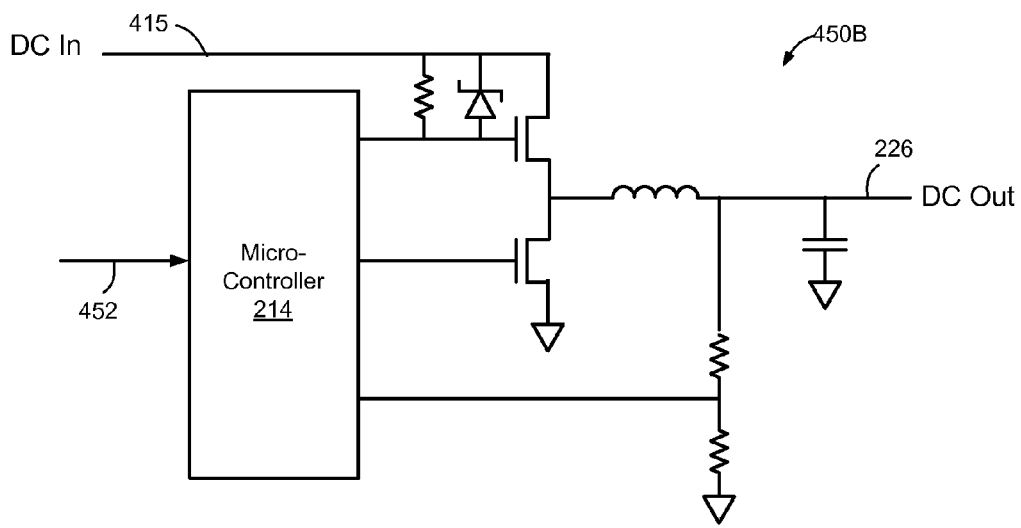
FIG. 10 illustrates an exemplary synchronous buck converter using a microcontroller.

FIGS. 8, 9, and 10 illustrate exemplary circuitry that may be used to regulate and adjust power levels for the power amplifier 210 and other transmit circuitry 202. In FIG. 8, an AC-DC power supply 400 converts 120 volts AC 405 to the various DC voltages that may be required by the transmitter, such as, for example, 5 volt and 100 mA auxiliary power to run the transmit circuitry 202 and 5-12 volt and 500 mA main power to run the power amplifier 210, which drives the transmit antenna 204.

An AC-DC converter 410 generates an intermediate DC voltage 415 (also referred to herein as "DC in") for a circuitry regulator 420 and a PA regulator 450. The circuitry regulator 420 provides general power 425 for the transmit circuitry 202 and the PA regulator provides variable power levels for the power in signal 226 to drive the PA 210.

The AC-DC converter 410 may be, for example, a conventional "wall wart" that allows an Underwriter Laboratories (UL) and Canadian Standards Association (CSA) approved power supply to be the "certified" section of the system while keeping costs down. Quasi-regulated (e.g., about 10%) wall warts are inexpensive and are available from a wide variety of vendors.

As non-limiting examples, the circuitry regulator 420 and a PA regulator 450 may be implemented as buck voltage converters. The dual buck design of a circuitry regulator 420 and a PA regulator 450 may keep efficiencies high, at the expense of additional switch-mode controllers, Field Effect Transistors (FETs), capacitors, and inductors.

Thus, the circuitry regulator 420 may be a low-power fixed-output buck converter that provides 5 volts for the controller 214 and other circuitry as illustrated in FIG. 4. The PA regulator 450 may be a higher power variable-output buck converter that supplies a varying voltage to the power amplifier to control the power output of the transmitter. The power amplifier supply 226 is controllable by a control signal 452 from the transmit circuitry 202 to the PA regulator 450, which varies the transmitted RF power over, for example, a range of about 50 mW to about 5 watts.

FIG. 9 illustrates a PA regulator 450A implemented as a Pulse Width Modulator (PWM) controller 460 (such as a Linear Technology LTC3851) that drives two N-channel transistors to comprise a synchronous buck converter. A small inductor, a resistor ladder, and an output capacitor filter the output of the transistors to complete the buck converter. The buck converter converts and regulates the DC in voltage 415 to a DC out voltage 226.

Power output may be controlled, for example, by a digital (programmable) potentiometer 465 controlled by the control signal 452. The control signal 452 may be driven by the controller 214 (FIG. 4) such that the DC out voltage 226 can be set anywhere from, for example, 5 to 12 volts DC. PA regulator 450A takes very little controller overhead, and may be configured to have guaranteed loop stability under conditions of rapidly changing load with over 90% efficiency.

Alternatively, FIG. 10 illustrates a PA regulator 450B as a synchronous buck converter using a microcontroller 470. The microcontroller 470 may be dedicated to the synchronous buck converter function. However, in some exemplary embodiments, the controller 214 of the transmitter 200 (FIG. 4) may be used for the synchronous buck converter function as well as the other functions that it is performing. The buck converter converts and regulates the DC in voltage 415 to a DC out voltage 226.

Thus, the microcontroller 470 may directly drive a P-channel and an N-channel FET to provide the switch control for the buck converter. A small inductor, a resistor ladder, and an output capacitor filter the output of the transistors to complete the buck converter. Feedback may be directly into an A/D input of the microcontroller 470 as a voltage sensing operation. Thus, the control signal 452 may be embodied as a sampled version of the voltage on DC out 226. The microcontroller 470 may compare actual output on DC out 226 to desired output and correct the PWM signal accordingly. Since frequencies may be much lower for a microcontroller 470 implementation, a larger inductor may be required, which is not a big problem in the transmitter. A microcontroller 470 implementation may be considerably cheaper, since no separate PWM controller is required.

As stated above, benefits to allowing for dynamically adjustable transmit power are:

1—customization of the power delivered to individual device types thereby allowing for more device types to be charged with a single charger design;

2—avoidance of wasted radiated power by allowing for varying power levels to be delivered to multiple devices as a function of current battery charge level in a way that doesn't impact charge times of other devices;

3—improved charge times by allowing for radiated power levels based on the individual device's coupling levels to the transmitter in a manner that still meets SAR requirements; and 4—reduced power consumption when the charger is not charging a device (beacon mode) and reduced interference to nearby electronics.

Figure 11:
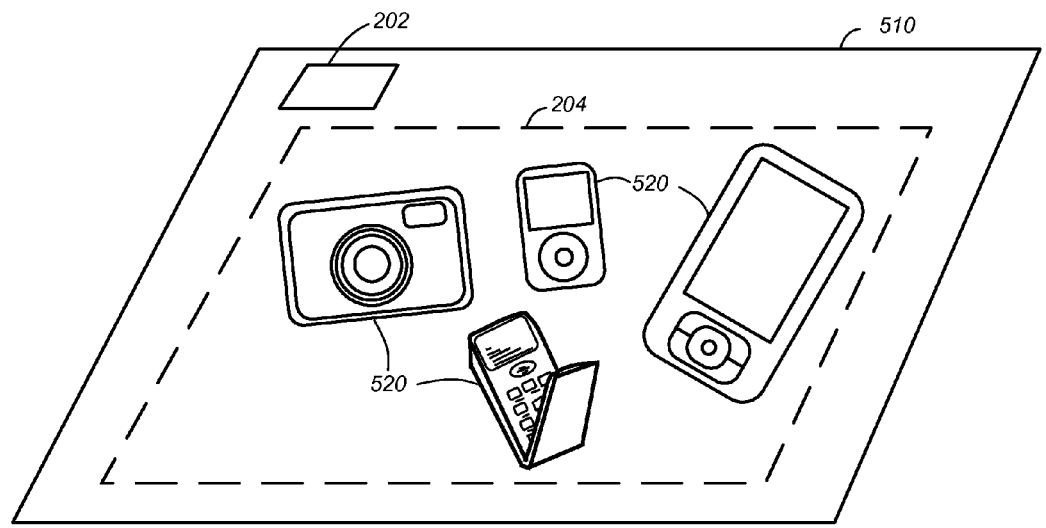
FIG. 11 illustrates a host device with a transmit antenna and including receiver devices placed nearby.

FIG. 11 illustrates a host device 510 with transmit circuitry 202 and a transmit antenna 204. Receiver devices 520 are shown placed within the coupling-mode region of the transmit antenna 204. Although not illustrated, the receiver devices may include receive antennas 304 and receive circuitry 302 as shown in FIG. 5. In FIG. 11, the host device 410 is illustrated as a charging mat, but could be integrated into furniture or building elements such as walls, ceilings, and floors. Furthermore, the host device 510 may be an item such as, for example, a handbag, backpack, or briefcase with a transmitter built in. Alternatively, the host device may be a portable transmitter specifically designed for a user to transport and charge receiver devices 520, such as a charging bag.

"Coplanar," as used herein, means that the transmit antenna and receive antenna have planes that are substantially aligned (i.e., have surface normals pointing in substantially the same direction) and with no distance (or a small distance) between the planes of the transmit antenna and the receive antenna. "Coaxial," as used herein, means that the transmit antenna and receive antenna have planes that are substantially aligned (i.e., have surface normals pointing in substantially the same direction) and the distance between the two planes is not trivial and furthermore, the surface normal of the transmit antenna and the receive antenna lie substantially along the same vector, or the two normals are in echelon.

Coplanar placements may have relatively high coupling efficiencies. However, coupling may vary depending on where the receive antennas are placed relative to the transmit antenna. For example, a coplanar placement point outside of the transmit loop antenna may not couple as efficiently as a coplanar placement point inside the transmit loop. Furthermore, coplanar placement points within the transmit loop, but at different locations relative to the loop, may have different coupling efficiencies.

Coaxial placements may have lower coupling efficiencies. However, coupling efficiencies may be improved with the used of repeater antennas, such as are described in U.S. Utility patent application Ser. No. 12/249,875 entitled "METHOD AND APPARATUS FOR AN ENLARGED WIRELESS CHARGING AREA" filed on Oct. 10, 2008, the contents of which is incorporated by reference herein in its entirety.

Figure 12A:
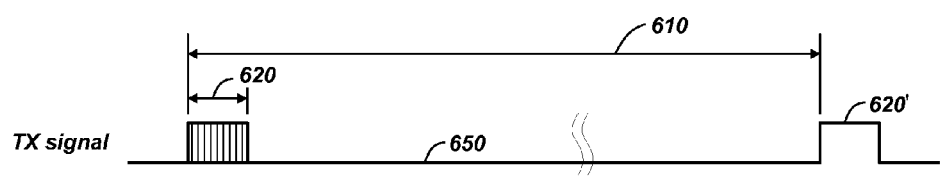
FIGS. 12A and 12B are simplified timing diagrams illustrating a messaging protocol for communication between a transmitter and a receiver and for power transmission.

FIG. 12A is a simplified timing diagram illustrating an exemplary messaging protocol for communication between a transmitter and a receiver using the signaling techniques discussed above. In one exemplary approach, signals from the transmitter to the receiver are referred to herein as a "forward link" and use a simple AM modulation between normal power transmission and lower power transmission. Other modulation techniques are also contemplated. As a non-limiting example, a signal present may be interpreted as a "1" and no signal present may be interpreted as a "0" (i.e., on-off keying).

Reverse link signaling is provided by modulation of power drawn by the receive device, which can be detected by the load sensing circuit in the transmitter. As a non-limiting example, higher power states may be interpreted as a 1 and lower power states may be interpreted as a 0. It should be noted that the transmitter must be on for the receiver to be able to perform the reverse link signaling. In addition, the receiver should not perform reverse link signaling during forward link signaling. Furthermore, if two receive devices attempt to perform reverse link signaling at the same time a collision may occur, which will make it difficult, if not impossible for the transmitter to decode a proper reverse link signal.

FIG. 12A illustrates a simple and low power form of the messaging protocol. A synchronization pulse 620 is repeated every recurring period 610 (about one second in the exemplary embodiment) to define the beginning of the recurring period. As a non-limiting example, the sync pulse on time may be about 40 mS. The recurring period 610, with at least a synchronization pulse 620, may be repeated indefinitely while the transmitter is on. Note that "synchronization pulse" is somewhat of a misnomer because the synchronization pulse 620 may be a steady frequency during the pulse period 620. The synchronization pulse 620 may also include signaling at the resonant frequency with the ON/OFF keying discussed above and as illustrated by the "hatched" pulse 620. FIG. 12A illustrates a minimal power state wherein power at the resonant frequency is supplied during the synchronization pulse 420 and the transmit antenna is off during a power period 650. All receiver devices are allowed to receive power during the synchronization pulse 420.

Figure 12B:
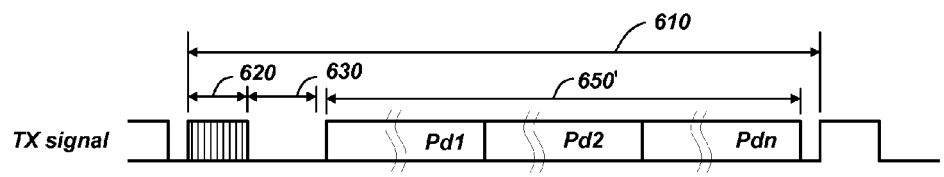

FIG. 12B illustrates the recurring period 610 with a synchronization pulse 620, a reverse link period 630 and a power period 650' wherein the transmit antenna is on and supplying full power by oscillating at the resonant frequency and not performing any signaling. The power period 450' may be segmented into different periods for multiple receiver devices as is explained below. FIG. 12B shows three power segments Pd1, Pd2, and Pdn for three different receiver devices.

The on-off keying communication protocol discussed above may be expanded to enable each receiver device to request charge and indicate desired power parameters as discussed above. In addition, a receiver device may identify itself with a unique identifier, such as, for example a serial number or a tag associating the receiver device with a specific user. The requesting receiver device may also communicate additional information such as class of device (e.g., camera, cell phone, media player, personal digital assistant).

Receiver information may include items such as; unique device identifiers, device types, contact information, and user-programmed information about the device. For example, the device may be a music player, from a specific manufacturer, that is tagged with a user's name. As another example, the device may be an electronic book, from a specific manufacturer, with a specific serial number that is tagged with a user's name.

In addition to communication using the on-off keying communication protocol discussed above, the receiver and transmitter may communicate on a separate communication channel 119 (e.g., Bluetooth, zigbee, cellular, etc.). With a separate communication channel, the recurring period need not include any communication periods and the entire time may be devoted to the power period 650'. The transmitter may still allocate time slots to each receiver device (communicated over the separate communication channel) and each receiver device only gets on the bus for its allocated power segment Pdn.

As described above, it may be important in many applications to be able to allocate a certain percentage of power between each of the powered receiver devices, so that each receiver device is powered appropriately. In some cases this will be an even division of power between all receiver devices. In other cases, one receiver device may need more power, perhaps due to a higher power task it must perform periodically. In yet other cases, one receiver device may need less power, perhaps due to a battery being fully charged. In such a case, the system may want to distribute that receiver device's power allocation to other devices.

There are a number of approaches to power sharing. One simple way is to have all receiver devices receiving power at the same time, thus sharing the power available in the wireless power environment. This method is simple, inexpensive and robust, but it may have a drawback that in many RF/inductive charging environments, one receiver device may couple to the transmit antenna better than another receiver device. As a result, the first receiver device may get most of the power. Another drawback is that there is no way to "throttle back" power to a receiver device that has a fully charged battery.

Another way to allocate power between multiple receiver devices is time division multiplexing, where one receiver device at a time is enabled to receive power. All receiver devices not receiving power are disabled from receiving power so that they do not interact with the RF/inductive environment. Time division multiplexing requires a controller that can apportion power between several powered devices, and can optionally make decisions on unequal allocations of power. As a non-limiting example a transmitter may reduce the length of, or eliminate, the power segment to a device that is fully charged. Time division multiplexing may have the drawback of losing some efficiency, since summing the coupling efficiency of all receiver devices receiving simultaneously may not equal the efficiency of each receiver device receiving power sequentially. In addition, a receiver device that is off may have to store power for a long time until its next on period, thus requiring a larger/more expensive charge storage device.

Exemplary embodiments of the disclosure are directed to a hybrid technique. In an exemplary embodiment of the disclosure, a number of receiver devices share a wireless charging area. Initially, they may all share receive power simultaneously. After some time, a control system, which includes feedback from the receiver devices, notes how much power each receiver device is actually receiving, and if needed, adjusts power via a time division multiplexing approach, a power level adjustment approach, or a combination thereof. In most cases, each receiver device will receive power for most of the time. At some point in time, some receiver devices may be turned off or disabled from receiving power to reduce their total power received. For example, a receiver device that is placed on the transmit coil so that it receives most of the power might be turned off for part of the time so that other receiver devices receive more power. As a result, the imbalance caused by the placement of various receiver devices may be corrected. Another example might be two receiver devices that are placed so they both share power, and initially both are on 100% of the time. As one device finishes charging its battery, it could begin to turn itself off for a larger and larger percentage of the time to allow more power to reach the other device. Alternatively, the transmitter could begin allocating a smaller and smaller time slot for the almost charged receiver device to allow more power to reach the other receiver devices.

Figure 13A:
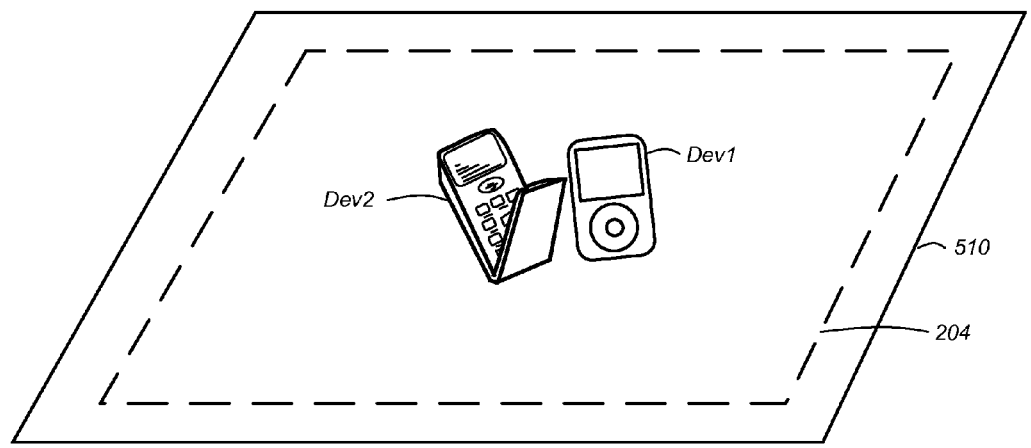
FIG. 13A-13C illustrates a host device with a transmit antenna and including receiver devices placed in various positions relative to the transmit antenna.
Figure 13B:
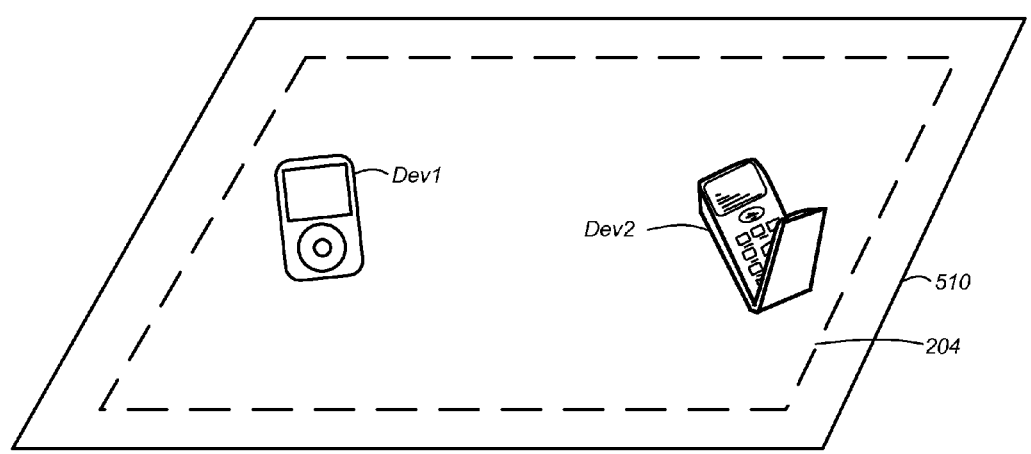
Figure 13C:
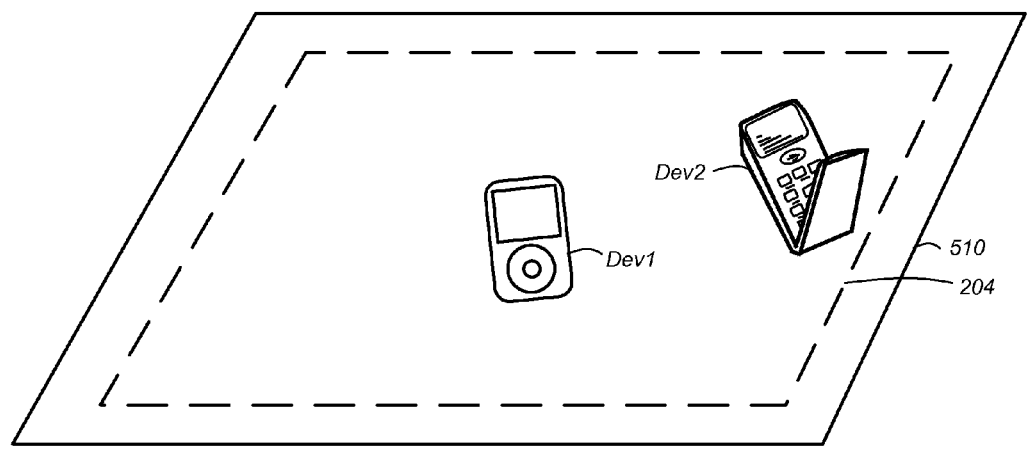

FIG. 13A-13C illustrates a host device 150 with a transmit antenna 204 and including receiver devices (Dev1 and Dev2) placed in various positions relative to the transmit antenna 204. For simplicity, only two receiver devices are discussed herein but use of multiple devices is also contemplated to be within the scope of the teachings of the disclosure and modification for such would be apparent to a person of ordinary skill in the art.

FIG. 13A illustrates a scenario where both receiver devices (Dev1 and Dev2) are positioned to receive substantially equal amounts of power from the transmit antenna 204, such as by being about the same distance away from the perimeter of the transmit antenna. In FIG. 13A receiver devices Dev1 and Dev2 are both placed near the center of the transmit antenna 204.

In FIG. 13B, the receiver devices Dev1 and Dev2 are placed away from each other but about the same distance from the perimeter of the transmit antenna 204. Thus, the receiver devices Dev1 and Dev2 do not have to be near each other or in the same geographical location within the powering region to receive the same amount of power from the transmit antenna 204. It should be noted that due to the varying coupling efficiencies associated with a device's distance from a transmitter, in a FIG. 13A setting, the receiver devices Dev1 and Dev2 may receive less power from the transmit antenna 204 than in a FIG. 4B setting. However, in each setting the amount of power received in one of the devices is substantially equal to the amount of power received in the other device.

FIG. 13C illustrates a scenario wherein the receiver devices Dev1 and Dev2 are positioned to receive unequal amount of power from the transmit antenna 204. In this example, receiver device Dev1 is placed near the center of the transmit antenna 204, and will likely receive less power than receiver device Dev2 placed closer to the transmit antenna 204. In this scenario, Dev2 would charge faster than Dev1 and therefore become fully charged sooner than Dev1.

FIGS. 14A-14G are simplified timing diagram illustrating adaptive power control for delivering power to multiple receiver devices. For simplicity, only two devices are discussed herein but use of multiple devices is also contemplated to be within the scope of the teachings of the disclosure and modification for such would be apparent to a person of ordinary skill in the art.

Figure 14A:
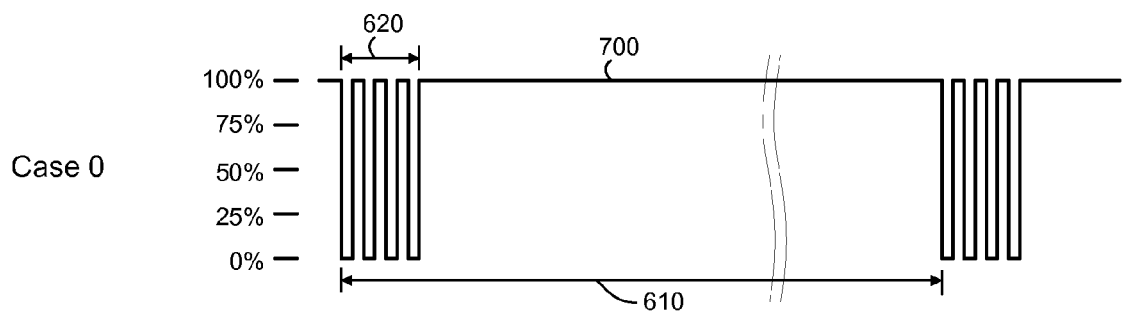
FIGS. 14A-14G are simplified timing diagram illustrating adaptive power control for delivering power to multiple receiver devices.

In FIG. 14A, a case 0 scenario shows a time line 700 to illustrate when a single receiver device is placed within the powering region of the transmitter antenna 204. In this scenario, the single receiver device receives substantially all of the power provided by the transmit antenna 204 during each recurring period 610. As discussed above with reference to FIGS. 12A and 12B, a portion 620 of the recurring period 610 maybe spent on optional signaling.

Figure 14B:
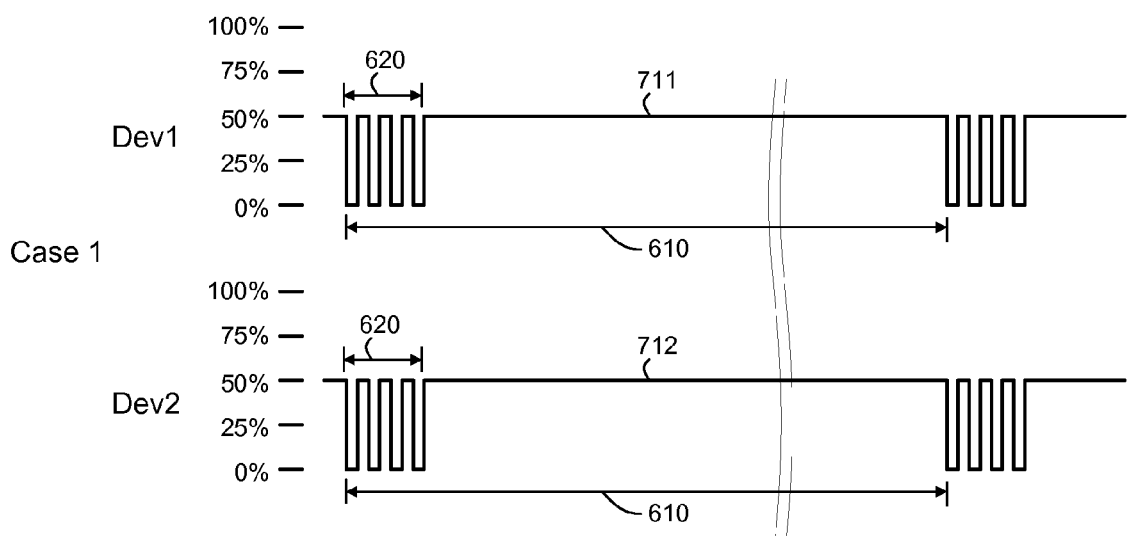

In FIG. 14B, a case 1 scenario shows a time line 711 for receiver device Dev1 and a time line 712 for receiver device Dev2. In this case, each receiver device Dev1 and Dev2 is consuming about 50% of the power supplied by the transmit antenna 204. Scenario 14B is likely when the two receiver devices are positioned symmetrically within a powering region of the transmit antenna 204, such as in FIGS. 13A and 13B. Thus, each of the receiver devices Dev1 and Dev2 receive an equal amount of power during the recurring period 610, such as receiving 50% of the power as shown by the vertical axis. Signaling periods 620 may also be used to allow communication between transmitter and receiver, and may reduce the charging time available for both devices.

Figure 14C:
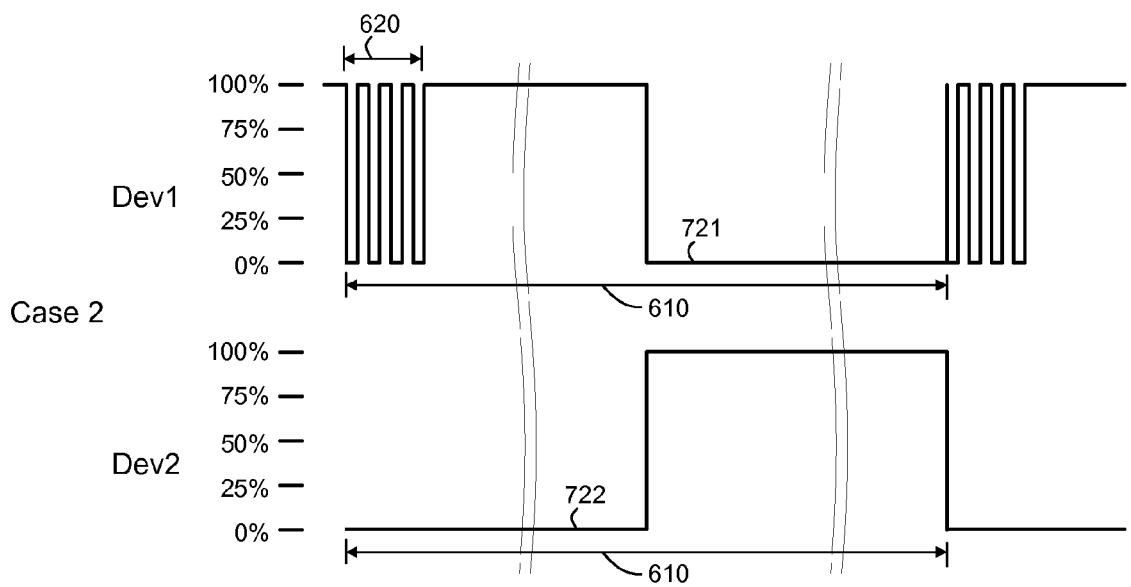

In FIG. 14C, a case 2 scenario, illustrated by times lines 721 and 722, uses time multiplexing. Thus, each of the receiver devices Dev1 and Dev2 receives an equal amount of power during the recurring period 610. However, in case 2, Dev1 is enabled to receive 100% of the power for 50% of the recurring period 610, and Dev2 is enabled to receive 100% of the power for the other 50% of the recurring period 610. Signaling periods 620 may also be used to allow communication between transmitter and receiver, and may reduce the charging time available for both devices.

Figure 14D:
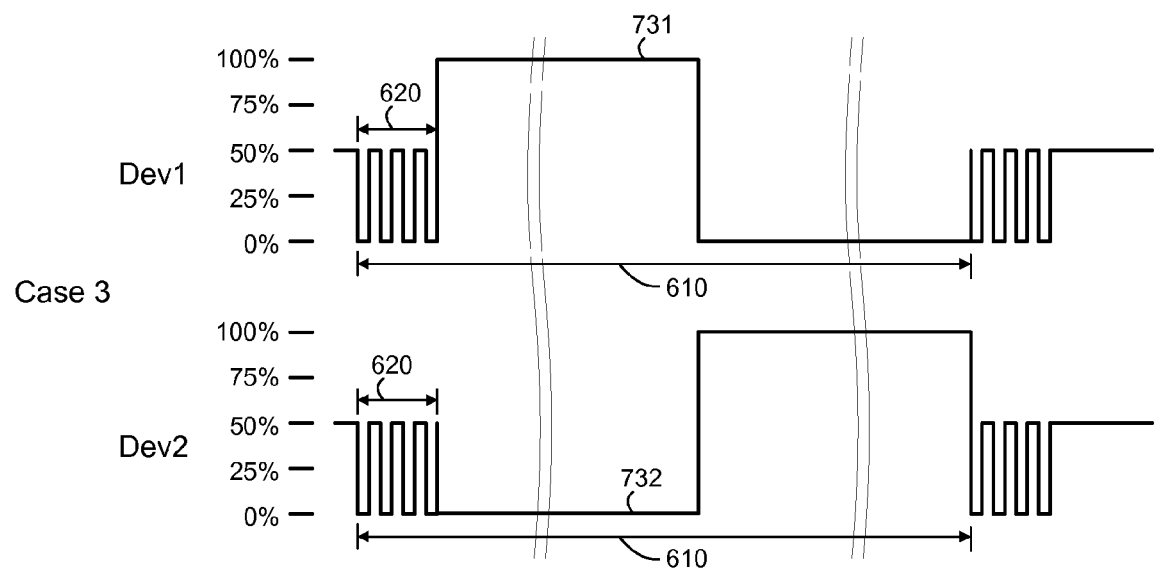

In FIG. 14D, a case 3 scenario illustrates times lines 731 and 732, wherein both receiver devices Dev1 and Dev2 may be enabled to receive power during the signaling periods 610. Even though signaling may be occurring, the receiver devices Dev1 and Dev2 can still extract power from the signal. Thus, in case 3 each of the receive devices is enabled to receive power during the signaling periods 620 and thus receive about 50% of the power during the signaling periods 620. The power portion of the recurring period 610 (i.e., the portion of the recurring period 610 not used by the signaling period 620) may be equally split to time division multiplex between receiver device Dev1 and receiver device Dev2.

Figure 14E:
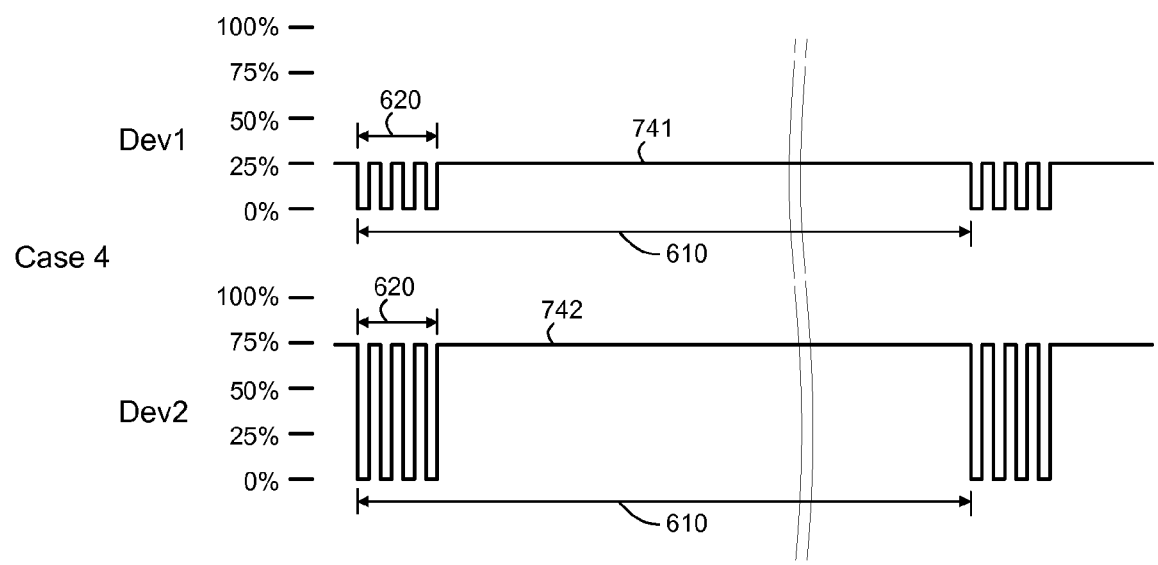

In FIG. 14E, a case 4 scenario shows a time line 741 for receiver device Dev1 and a time line 742 for receiver device Dev2. In case 4, the receiver devices Dev1 and Dev2 are positioned to receive unequal amount of power from the transmit antenna 204, such as receiver device Dev1 placed near the center of the transmit antenna 204 and receiving less power than receiver device Dev2 placed closer to the transmit antenna 204 (as shown in FIG. 13C). Each of receiver devices Dev1 and Dev2 rely on their coupling to the transmit antenna 204 to apportion the power between the two devices in the powering region. Thus, in case 4, a better positioned receiver device, such as receiver device Dev2, receives about 75% of the power while receiver device Dev1 receives the other 25% of the power, since power division is sub-optimally determined purely by position relative to the transmit antenna 204.

Figure 14F:
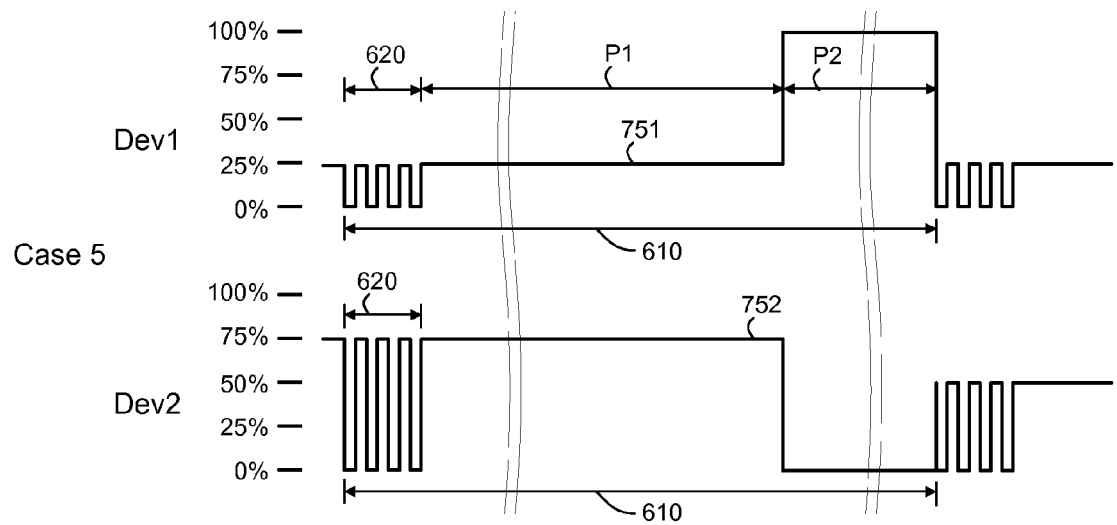

In FIG. 14F, a case 5 scenario shows a time line 751 for receiver device Dev1 and a time line 752 for receiver device Dev2. In case 5, the receiver devices Dev1 and Dev2 are positioned to receive unequal amount of power from the transmit antenna in a similar manner to that of FIG. 14E. However, while each receiver device relies partly upon its relative coupling to the transmit antenna 204 to apportion power, each receiver device can also decouple itself from the transmit antenna 204 if needed. If a 50/50 power split is desired, receiver device Dev2 can disable itself from receiving power for a P2 portion of the recurring period 610, while Dev1 remains enabled to receive 100% of the power during the P1 portion.

During the P1 portion and the signaling portion 620 both receiver devices remain on such that receiver device Dev1 receives about 25% of the power and receiver device Dev2 receives about 75% of the power. The lengths of the P1 portion and P2 portion may be adjusted such that about 50% of the power (or other apportionment, if desired) is allocated to each receiver device Dev1 and Dev2. Case 5 is similar to case 2, but requires less off-time. For example in case 5 receive device Dev1 is never turned disabled from receiving power and just receives more power during the P2 portion due to receiver device Dev 2 being disabled.

Figure 14G:
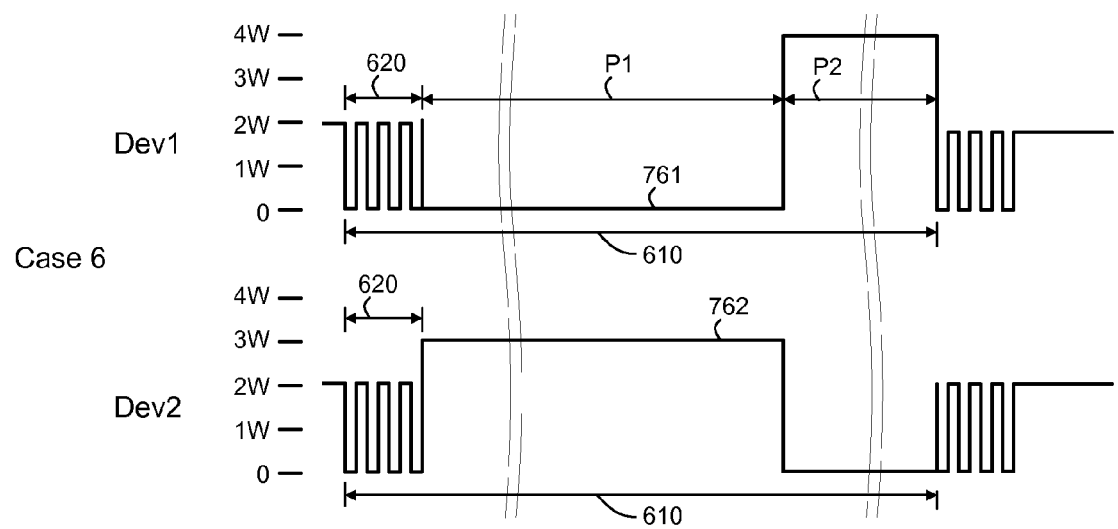

In FIG. 14G, a case 6 scenario shows a time line 761 for receiver device Dev1 and a time line 762 for receiver device Dev2. Recall from the discussion above with respect to FIGS. 7-10, that the power output of the transmit antenna 204 may be adjusted. Thus, in FIG. 14G power output is shown in terms of Watts, rather than in terms of percentage of full power. In case 6, receiver devices Dev1 and Dev2 are positioned to receive about equal amounts of power from the transmit antenna 204. Thus, during the signaling period 620 the transmitter may be set to deliver about 4 Watts and each of receiver devices Dev1 and Dev 2 may receive about 2 Watts. During the P1 portion, receiver device Dev1 is disabled from receiving power and the power output of the transmit antenna is set to about 3 Watts, which is mostly consumed by receiver device Dev2. During the P2 portion, receiver device Dev2 is disabled from receiving power and the power output of the transmit antenna is set to about 4 Watts, which is mostly consumed by receiver device Dev1.

FIGS. 14A-G are given as examples of some possible scenarios. A person of ordinary skill in the art would recognize that many other scenarios involving more receiver devices and various power output levels are contemplated within the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transmitter, comprising:
a transmit antenna configured to generate an electromagnetic field having a region for wirelessly transferring power from the transmit antenna to a plurality of receiver devices; and
a controller operably coupled to the transmit antenna, wherein the controller is configured to:
determine a power allocation within a time period for a particular one of the plurality of receiver devices disposed within the region, the time period recurring at an interval, and
adjust the power allocation within a subsequent time period based on a power requirement received from the particular one of the plurality of receiver devices.

2. The wireless power transmitter of claim 1, wherein the controller is further configured to
receive power requirements from the plurality of receiver devices; and
control the transmit antenna to sequentially charge ones of the plurality of receiver devices in connection with cloaking on each device to be charged and cloaking off devices not receiving charging.

3. The wireless power transmitter of claim 1, further comprising:
an amplifier configured to apply a Radio Frequency (RF) signal to the transmit antenna; and
a power amplifier regulator operably coupled to the amplifier and the controller; and
wherein the controller is configured to:
define a plurality of power allocation periods during the time period, each defined power allocation period corresponding to a specific receiver device of the plurality of receiver devices, and
control the power amplifier regulator to set a power level of the amplifier to a first power level for one of the plurality of defined power allocation periods and a second power level for other power allocation periods of the plurality of defined power allocation periods.

4. The wireless power transmitter of claim 3, wherein the power amplifier regulator comprises a buck converter including a potentiometer operably coupled to the controller for adjusting a power level of the amplifier.

5. The wireless power transmitter of claim 3, wherein the power amplifier regulator comprises a buck converter and the controller is further configured to sample a power level of the amplifier and adjust a power output of the buck converter responsive to the sampled power level.

6. The wireless power transmitter of claim 3, wherein the controller is further configured to determine the first power level to share power between the plurality of receiver devices.

7. The wireless power transmitter of claim 1, further comprising:
an amplifier configured to apply a Radio Frequency (RF) signal to the transmit antenna.

8. The wireless power transmitter of claim 7, wherein the time period includes time-multiplexed portions and the controller is further configured to:
during a synchronization portion of the period, enable the amplifier to apply the RF signal to the transmit antenna to generate the electromagnetic field; and
during a power transmission portion of the time period:
continue enabling the amplifier to apply the RF signal when there is at least one receiver device requiring power within the region designated to accept power from the electromagnetic field; and
disable the amplifier from applying the RF signal to the transmit antenna when there are no receiver devices requiring power within the region designated to accept power from the electromagnetic field.

9. The wireless power transmitter of claim 1, wherein the controller is further configured to adjust the power level of the electromagnetic field responsive to a power level request received from a receiver device of the plurality of receiver devices.

10. The wireless power transmitter of claim 9, further comprising an amplifier configured to apply an RF signal to the transmit antenna, and wherein the controller is further configured to adjust the power level of the electromagnetic field by adjusting a voltage level to the amplifier responsive to a voltage indicator received from a receiver device of the plurality of receiver devices.

11. The wireless power transmitter of claim 9, further comprising an amplifier configured to apply an RF signal to the transmit antenna and wherein the controller is further configured to adjust the power level of the electromagnetic field by adjusting a current level to the amplifier responsive to a current indicator received from the receiver device.

12. The wireless power transmitter of claim 1, further comprising:
an amplifier configured to apply a Radio Frequency (RF) signal to the transmit antenna; and
a load sensing circuit operably coupled to the amplifier and the controller, the load sensing circuit configured to detect changes in power consumption by the amplifier and generate a serial response signal to the controller representative of the changes in power consumption; and
wherein the controller is further configured to decode the serial response signal to determine at least one of a presence of a new receiver device in the region or receiver information of an existing receiver device in the region.

13. The wireless power transmitter of claim 1, wherein the controller is further configured to communicate to the receiver device during a signaling portion of the time period to indicate a portion of the time period that the receiver device should be disabled from receiving power from the electromagnetic field.

14. A method of wireless power transfer, comprising:
generating an electromagnetic field having a region for wirelessly transferring power from a transmit antenna to a plurality of receiver devices;
determining a power allocation within a time period for a particular one of the plurality of receiver devices disposed within the region, the time period recurring at an interval; and
adjusting the power allocation within a subsequent time period based on a power requirement received from the particular one of the plurality of receiver devices.

15. The method of claim 14, further comprising monitoring power levels delivered to the plurality of devices and changing charging parameters in response to the monitored power levels.

16. The method of claim 15, wherein the charging parameters include current and voltage levels for delivery to the plurality of receiver devices.

17. The method of claim 14, comprising:
receiving power requirements from the plurality of receiver devices; and sequentially charging ones of the plurality of receiver devices in connection with the cloaking on of each device to be charged and the cloaking off of devices not receiving charging.

18. The method of claim 17, wherein receiving power requirements occurs in connection with receiving signals via on-off keying.

19. The method of claim 14, further comprising charging the plurality of devices through near field wireless charging.

20. The method of claim 14, further comprising adjusting an amount of power that is delivered to each receiver device by adjusting a transmitted power from the transmit antenna, adjusting an amount of time the power is transmitted for each receiver device, or a combination thereof.

21. The method of claim 14, comprising:
defining a beginning of the time period by on-off keying the electromagnetic field during a synchronization portion of the time period; and
during a power transmission portion of the time period:
coupling the electromagnetic field to a receive antenna of a first receiver device within the region; and
coupling the electromagnetic field to a receive antenna of a second receiver device within the region.

22. The method of claim 21, wherein:
a first portion of the electromagnetic field is coupled to the receive antenna of the second receiver device;
a second portion of the electromagnetic field is coupled to the receive antenna of the second receiver device; and
the first portion and the second portion are coupled to the first and second receiver devices based on a placement of the first receiver device and the second receiver device relative to the transmit antenna.

23. The method of claim 21, further comprising:
determining when there are a plurality of receivers within the region designated to accept power from the electromagnetic field;
allocating time-multiplexed segments of the power transmission portion to each of the plurality of receivers designated to accept power; and
communicating the time-multiplexed segment allocated to each of the plurality of receivers during the synchronization portion.

24. The method of claim 21, further comprising:
determining a coupling ratio of each of the first receiver device and the second receiver device indicating a portion of the power from the region that each receiver device is consuming; and
allocating time-multiplexed segments of the power transmission portion responsive to the coupling ratio of at least one of the first receiver device and the second receiver device.

25. The method of claim 21, further comprising adjusting a power output level of the transmit antenna to at least two different levels for at least two different time-multiplexed segments of the power transmission portion.

26. The method of claim 24, wherein adjusting the power output level comprises adjusting one of a voltage and a current to an amplifier operably coupled to the transmit antenna.

27. The method of claim 24, wherein adjusting the power output level is responsive to a power level request received from the first receiver device, the second receiver device, or a combination thereof.

28. A power transfer system, comprising:
means for generating an electromagnetic field having a region for wirelessly transferring power from a transmit antenna to a plurality of receiver devices;
means for determining a power allocation within a time period for a particular one of the plurality of receiver devices disposed within the region, the time period recurring at an interval; and
means for adjusting the power allocation within a subsequent time period based on a power requirement received from the particular one of the plurality of the receiver devices.

29. The power transfer system of claim 28, wherein the means for generating a region comprises a transmit antenna, the means for determining a power allocation comprises a first controller, and the means for adjusting the power allocation comprises a second controller.

30. The wireless power transmitter of claim 28, further comprising:
means for receiving power requirements from the plurality of receiver devices; and
means for controlling the transmit antenna to sequentially charge ones of the plurality of receiver devices in connection with cloaking on each device to be charged and cloaking off devices not receiving charging.

31. The power transfer system of claim 28, further comprising means for adjusting an amount of power that is delivered to each receiver device by adjusting a transmitted power from the transmit antenna, adjusting an amount of time the power is transmitted for each receiver device, or a combination thereof.

32. The power transfer system of claim 28, wherein the means for generating the electromagnetic field at a resonant frequency is configured to create a region for wirelessly transferring power within a near field of the transmit antenna, the system further comprising:
means for defining a beginning of the time period by on-off keying the electromagnetic field during a synchronization portion of the time period;
means for coupling, during a power transmission portion of the time period, the electromagnetic field to a receive antenna of a first receiver device within the region; and
means for coupling, during a power transmission portion of the time period, the electromagnetic field to a receive antenna of a second receiver device within the region.

33. The power transfer system of claim 32, wherein:
a first portion of the electromagnetic field is coupled to the receive antenna of the second receiver device; and
a second portion of the electromagnetic field is coupled to the receive antenna of the second receiver device,
wherein the first portion and the second portion are coupled to the first and second receiver devices based on a placement of the first receiver device and the second receiver device relative to the transmit antenna.

34. The power transfer system of claim 32, further comprising:
means for determining when there are a plurality of receivers within the region designated to accept power from the electromagnetic field;
means for allocating time-multiplexed segments of the power transmission portion to each of the plurality of receivers designated to accept power; and
means for communicating the time-multiplexed segment allocated to each of the plurality of receivers during the synchronization portion.

35. The power transfer system of claim 32, further comprising:
means for determining a coupling ratio of each of the first receiver device and the second receiver device indicating a portion of the power from the region that each receiver device is consuming; and means for allocating time-multiplexed segments of the power transmission portion responsive to the coupling ratio of at least one of the first receiver device and the second receiver device.

36. The power transfer system of claim 32, further comprising means for adjusting a power output level of the transmit antenna to at least two different levels for at least two different time-multiplexed segments of the power transmission portion.

37. The power transfer system of claim 36, wherein the means for adjusting the power output level comprises means for adjusting one of a voltage at and a current into an amplifier operably coupled to the transmit antenna.

38. The power transfer system of claim 36, wherein the means for adjusting the power output level is responsive to a power level request received from the first receiver device, the second receiver device, or a combination thereof.

39. The power transfer system of claim 28, comprising:
  means for wirelessly receiving power requirements from devices to be charged;
  means for detecting a power component threshold; and
  means for changing a power component of a signal based on the received power requirements, the signal being configured to be transmitted in response to monitoring readings from the means for detecting a power component threshold.

40. A wireless power transmitter, comprising:
  a transmit antenna configured to generate an electromagnetic field having a region for wirelessly transferring power from the transmit antenna to a plurality of receiver devices; and
  a controller operably coupled to the transmit antenna, wherein the controller is configured to:
    determine a power allocation within a first time period for a first one of the plurality of receiver devices disposed within the region; and
    determine a power allocation within a second time period for a second one of the plurality of receiver devices disposed within the region, at least one of the first and second time periods recurring at an interval.

41. The wireless power transmitter of claim 40, wherein the controller is further configured to:
  adjust the power allocation for the first one of the plurality of receiver devices during a subsequent time period based on a power requirement received from the first one of the plurality of receiver devices.

42. The wireless power transmitter of claim 40, wherein the first and second time periods recur at an interval.

43. The wireless power transmitter of claim 40, wherein the controller is further configured to:
  control the transmit antenna to charge only the first one of the plurality of receiver devices during a first time period.

* * * * *